(No Model.) 2 Sheets—Sheet 1.
J. W. D. FIFIELD.
CRIMPING MACHINE.
No. 363,055. Patented May 17, 1887.
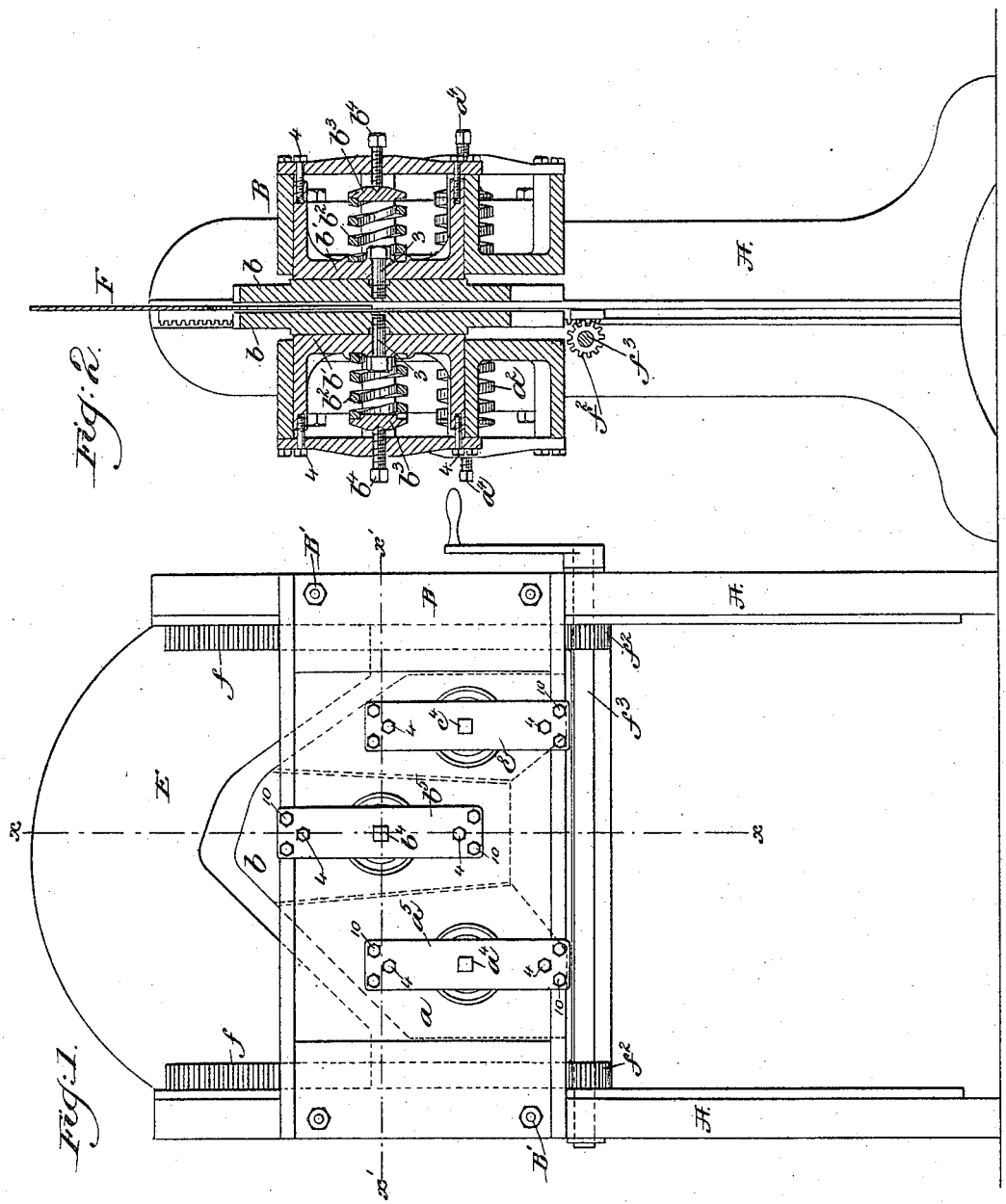
Witnesses.
Fred L. Emery.
John F. C. Prenkert,
Inventor
John W. D. Fifield.
by Crosby & Gregory attys (No Model.)　　　　　　　　　　　　　　　　　2 Sheets—Sheet 2.
J. W. D. FIFIELD.
CRIMPING MACHINE.
No. 363,055.　　　　　　　　　　Patented May 17, 1887.
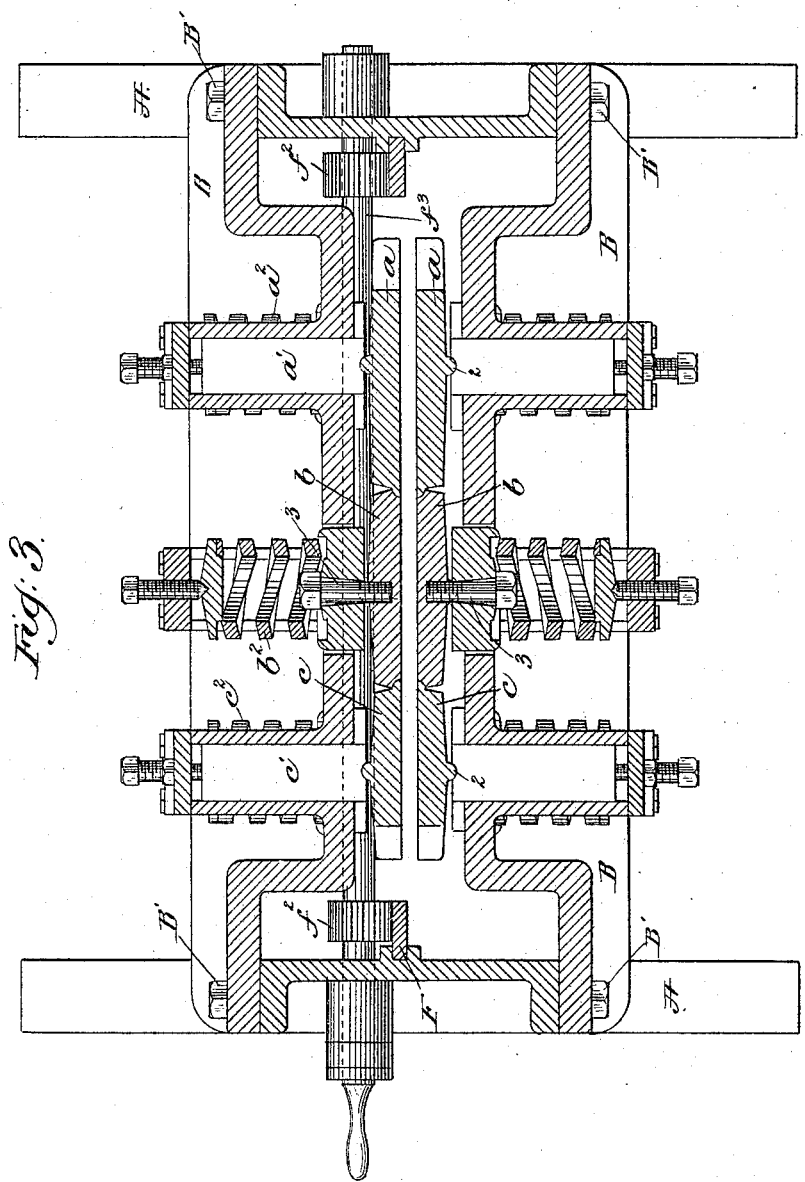

UNITED STATES PATENT OFFICE.

JOHN W. D. FIFIELD, OF NORTH BROOKFIELD, MASSACHUSETTS, ASSIGNOR TO THE STODDARD CRIMPING MACHINE COMPANY, OF HARTFORD, CONNECTICUT.

CRIMPING-MACHINE.

SPECIFICATION forming part of Letters Patent No. 363,055, dated May 17, 1887.

Application filed February 3, 1887. Serial No. 226,391. (No model.)

*To all whom it may concern:*

Be it known that I, JOHN W. D. FIFIELD, of North Brookfield, county of Worcester, and State of Massachusetts, have invented an Improvement in Crimping-Machines, of which the following description, in connection with the accompanying drawings, is a specification, like letters on the drawings representing like parts.

This invention has for its object to improve crimping-machines in such manner that the jaws may adapt themselves to varying thicknesses of vamps from toe to heel, the said jaws being made sectional, the lines of division being in the line of movement of the form.

My invention consists, essentially, in a crimping-machine having sectional jaws divided vertically, or in the line of movement of the form between the jaws, whereby the jaws are adapted to yield independently in the direction of their width, as will be described.

Figure 1, in side elevation, represents a sufficient portion of a crimping-machine to enable my invention to be understood; Fig. 2, a vertical section of Fig. 1 in the line $x$, and Fig. 3 an enlarged section in the line $x'$.

The standards A, constituting the ends of the machine, are united by cross-plates B, attached thereto by suitable bolts or screws, B', the said cross-plates being of such shape as to receive and guide the shanks of the sectional jaws.

I have herein shown each jaw as composed of three sections, $a\ b\ c$, placed side by side in the direction of the width of the machine, or from standard to standard, the lines of separation being somewhat inclined from the vertical, to thus prevent the vamp or upper carried by the form F (see Fig. 1) from being creased or marked when being passed between the jaws.

The form, preferably a steel plate, is provided near each end with rack-teeth $f$, which are engaged by pinions $f^2$ fast to the shaft $f^3$, which may be rotated in any usual manner, so long as the form is raised and lowered at the proper time.

The meeting edges of the jaws (see Fig. 3) are provided with grooves and projections fitting into each other, to thus enable each jaw to rock upon and support and guide the edge of the jaw next to it.

The shanks $a'\ b'\ c'$ of the sectional jaws are shown as rectangular, each one being like the other, each being free to slide back and forth horizontally in ways of the said cross-plates.

The sectional jaws $a\ b\ c$ are attached in like manner to the shanks, but all so that they are free to turn on or with relation to the shanks whenever the vamp or upper embracing the form is being passed between the jaws.

Each sectional jaw has points or projections, as 2, to act against and form a rocking bearing or seat for it, each jaw being connected to its shank by a screw, as 3, the latter being passed loosely through a hole in the shank, preferably of tapering form, and screwed into the sectional jaw, the screw being turned into the jaw, (see Fig. 2,) to thus hold the points or projections at the back of the jaw against the inner end of the shank.

Each shank $a'\ b'\ c'$ carrying a jaw has at its rear side a like spring, as $a^2\ b^2\ c^2$, against which bears a cap, as $a^3\ b^3\ c^3$, which is acted upon by a screw, as $a^4\ b^4\ c^4$, the turning of which in or out increases or decreases the pressure exerted by the spring, and consequently the effective pressure of the particular jaw opposite it, upon the leather which passes between the said jaw and the form, the spring being adjusted according to the material and its requirements. The screws $a^4\ b^4\ c^4$ are held, respectively, in bridge-plates $a^5\ b^5\ c^5$, attached by suitable screws, 10, to the cross-plates B, the said bridges also receiving in them loosely headed screws or studs 4, which are screwed into the shanks, (see Fig. 2,) the heads of the screws or pins acting against the bridges serving as inward stops for the shanks and jaws.

Prior to my invention I am not aware that the jaws of a crimping-machine have ever been divided up into connected sections to adapt them to varying thicknesses of vamp or upper; so I do not desire to limit my invention to the exact form of jaw shown, or to the exact number of pieces.

I claim—

1. In a crimping-machine, a reciprocating form, combined with sectional laterally-movable jaws divided in the direction of the movement of the form between the jaws, and with means, substantially as described, to guide the jaws in their lateral movements, substantially as set forth.

2. In a crimping-machine, the cross-plates and the springs, combined with the sectional jaws *a b c*, and the sliding shanks, to which the jaw-sections are pivoted, substantially as described.

3. In a crimping-machine, a reciprocating form, combined with sectional jaws divided in the direction of the movement of the form between the jaws and made laterally movable toward and from opposite sides of the form, the meeting edges of the jaws fitting and rocking one upon the other, substantially as described.

In testimony whereof I have signed my name to this specification in the presence of two subscribing witnesses.

JOHN W. D. FIFIELD.

Witnesses:
T. M. DUNCAN,
HIRAM KNIGHT.